United States Patent [19]

Fiegel et al.

[11] Patent Number: 5,018,782
[45] Date of Patent: May 28, 1991

[54] WIND DEFLECTOR FOR MOTOR VEHICLE ROOFS WITH A SLIDABLE COVER

[75] Inventors: Gunnar Fiegel; Stefan Schreiter, both of Wie Postanschrift, Fed. Rep. of Germany

[73] Assignee: Webasto AG Fahrzeugtechnik, Fed. Rep. of Germany

[21] Appl. No.: 487,282

[22] Filed: Mar. 2, 1990

[30] Foreign Application Priority Data

Mar. 3, 1989 [DE] Fed. Rep. of Germany ....... 3906903

[51] Int. Cl.$^5$ ................................. B60J 7/22
[52] U.S. Cl. ..................... 296/217; 296/180.5
[58] Field of Search .................. 290/217, 180.5

[56] References Cited

U.S. PATENT DOCUMENTS

| | | | |
|---|---|---|---|
| 3,984,143 | 10/1976 | Vermeulen | 296/217 |
| 4,332,416 | 6/1982 | Lutz et al. | 296/216 |
| 4,537,442 | 8/1985 | Jardin | 296/221 |

FOREIGN PATENT DOCUMENTS

| | | | |
|---|---|---|---|
| 3426998 | 1/1986 | Fed. Rep. of Germany | 296/217 |
| 1540614 | 2/1979 | United Kingdom | 296/217 |

OTHER PUBLICATIONS

Moller-Werke, "Cinpress", Brochure, 1988, 2 Pages.

*Primary Examiner*—Dennis H. Pedder
*Attorney, Agent, or Firm*—Sixbey, Friedman, Leedom & Ferguson

[57] ABSTRACT

Wind deflector for motor vehicle roofs with a cover to close or open a roof opening. The wind deflector exhibits an air conducting profile placed on the front edge of the roof opening that can be pushed out into an operating position under the influence of spring force and actuating arms connected to it which are hinged to pivot on an integral part of the roof and which, by sliding the cover in the closing direction, lower the air conducting profile member into a nonoperating position. The air conducting profile member carries a stopping strip which extends at least almost entirely over its full length and which, in the operating position of the wind deflector, lies against a stop on the front edge of the roof opening and thus limits the pushing-out movement of the wind deflector. The spring force is coordinated to the bending strength of the assembly consisting of the air conducting profile member and the stopping strip so that this assembly, by pressing the stopping strip on the stop, is automatically forced to form a curvature in the lengthwise direction of the air conducting profile that at least approximately corresponds to the curvature of the roof.

20 Claims, 3 Drawing Sheets

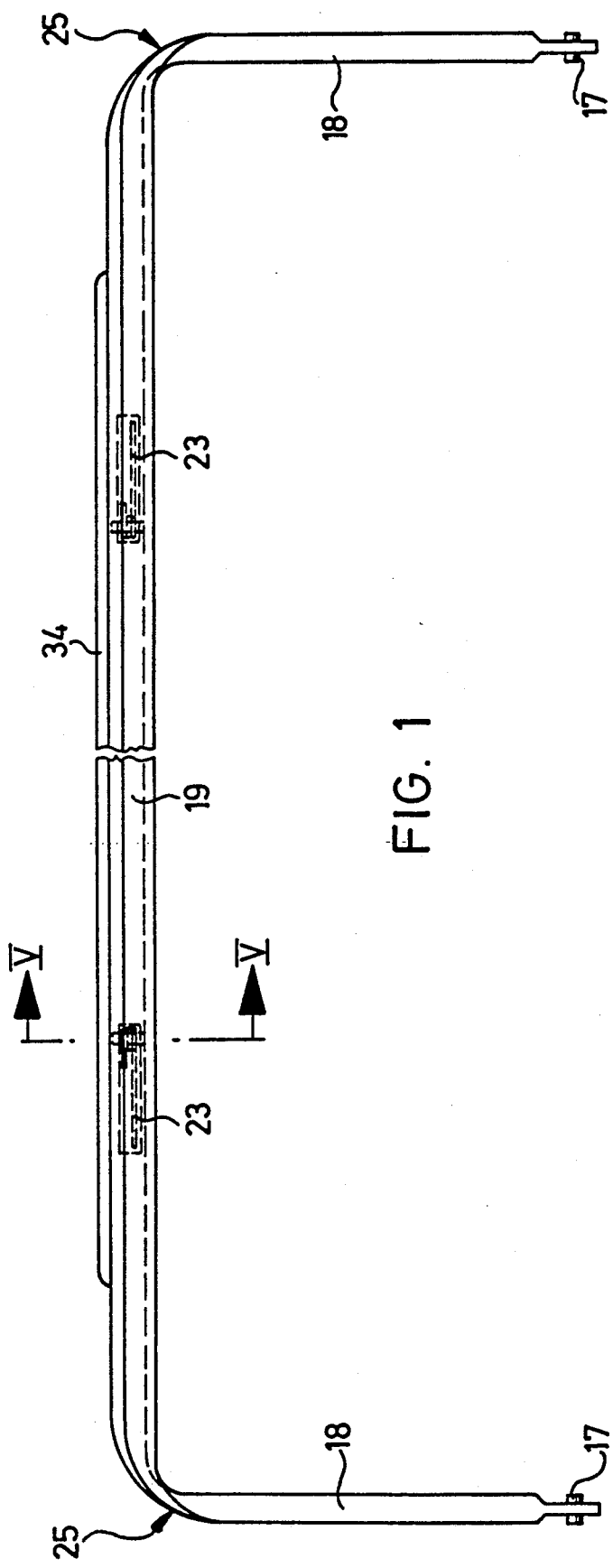
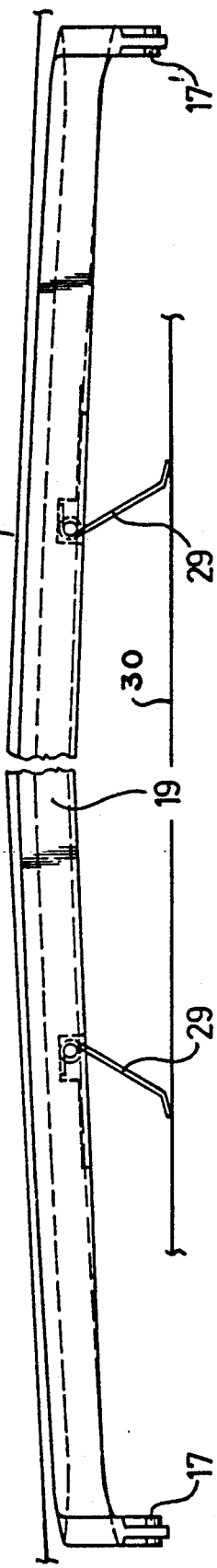
FIG. 1
FIG. 2

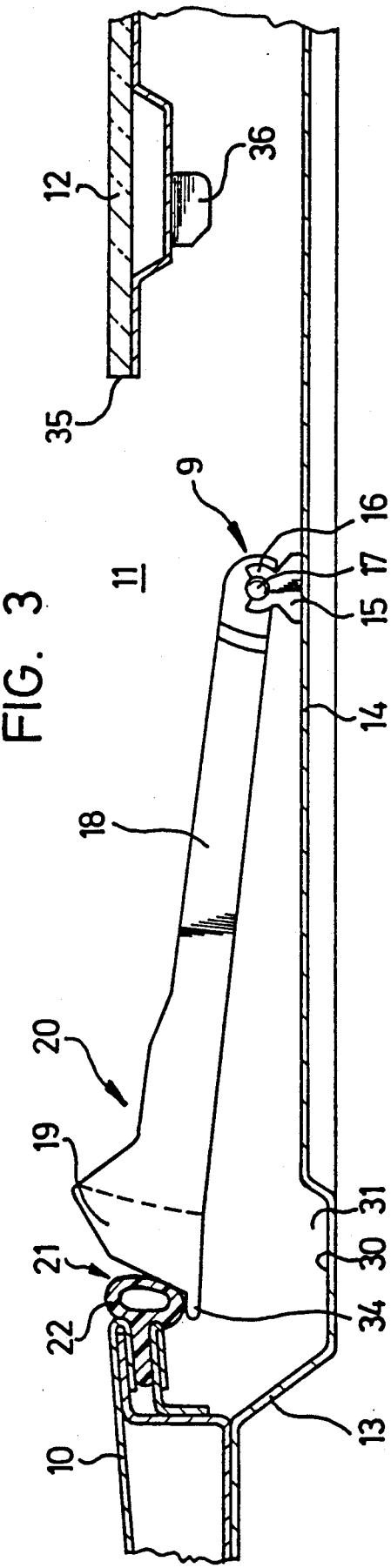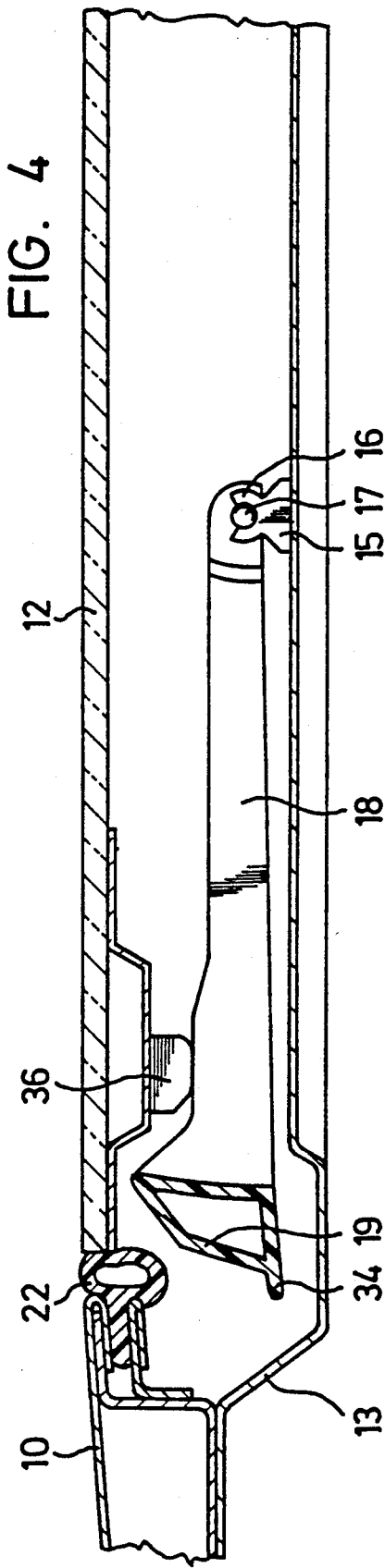

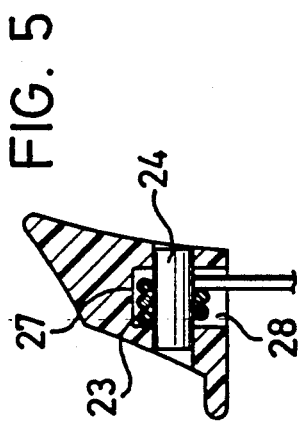

WIND DEFLECTOR FOR MOTOR VEHICLE ROOFS WITH A SLIDABLE COVER

BACKGROUND OF THE INVENTION

The invention relates to a wind deflector for motor vehicle roofs With a slidable cover for selectively closing and at least partially opening a roof opening. In particular, to such a roof wherein the wind deflector has an elongated air conducting profile member that is placed on the front edge of the roof opening, so as to run crosswise relative to the roof opening, the profile member being pushed out under the influence of spring force into an operating position and being lowered back into a nonoperating position by actuating arms that are connected to it, and are placed on both sides of the roof opening. The actuating arms are hinged to a part that is integral with the fixed roof in the area of their end that is furthest from the air conducting profile member, and, by pushing the cover into the closed cover position, the arms are pivoted into a position in which they lower the air conducting profile member into the nonoperating position. The air conducting profile member, in the area of its edge lying away from the actuating arms, carries a stopping strip which extends over almost the entire width of the air conducting profile member and which, in the operating position of the wind deflector, rests on a stop on the front edge of the roof opening and thus limits the push-out movement of the wind deflector.

A wind deflector of the above type is known from German Offenlegungsschrift 34 26 998. In practice, with this deflector, as with other known wind deflectors (see U.S. Pat. No. 4,332,416 FIGS. 4 and 9), the spring force has been set so that, when the cover is pushed back, the wind deflector is reliably tilted into its operating position. For series production, normally based on wind tunnel tests, the dimensions and the shape of the wind deflector are specified so that, even with an open cover, the air flow is guided quietly over the roof opening and undesired draft phenomena in the motor vehicle interior are avoided. However, in individual cases, during travel, disturbing wind noises and/or drafts sometimes still occur in the passenger seating compartment. This can be attributed, in particular, to unavoidable manufacturing and assembly tolerances of the fixed roof surface as well as of the wind deflector and its support. This problem can be counteracted, to a certain extent, by adjusting the wind deflector after installation in the motor vehicle. Except for the fact that the success of such an adjustment often leaves something to be desired, the adjustment requires complicated additional structural measure and work steps.

SUMMARY OF THE INVENTION

The invention is based on the object of providing a wind deflector for motor vehicle roofs that can be built and mounted easily and, nevertheless, in spite of manufacturing and assembly tolerances of the stationary roof surface, as well as of the wind deflector, perfectly guide air over the roof opening when it is at least partially open.

This object is achieved, according to preferred embodiments of the invention, with a wind deflector of the type mentioned above, by matching the spring force to the bending strength of the assembly consisting of the air conducting profile member and the stopping strip, so that this assembly, by pressing the stopping strip on the block of the roof opening, is automatically forced to form a curvature in the lengthwise direction of the air conducting profile member that at least approximately corresponds to the curvature of the roof.

The wind deflector according to the invention automatically matches itself to the position and the shape of the front edge of the roof opening. It thus makes do without adjustment means and corresponding installation-adjusting work. Deviations from the relevant design values, especially in the curvature of the stationary roof surface and in the wind deflector, are automatically compensated for. In this way, the air guiding features provided are maintained, despite manufacturing and assembly tolerances.

Advantageously, the assembly consisting of the air conducting profile member and stopping strip has, in the released state, a curvature that theoretically matches the designed curvature of the roof, so as to minimize the amount of tolerance compensation required.

The design of the wind deflector can be further simplified if the air conducting profile member is connected integrally to the stopping strip and, preferably, also to the actuating arms.

In another embodiment of the invention, to apply spring force, there is provided at least one leg spring that is connected to the air conducting profile member and has one leg braced on the air conducting profile member and another leg braced on a part that is located under the air conducting profile member and is integral with the roof. Such leg springs make it possible to apply relatively high spring force to the air conducting profile specifically where this is particularly desired for evening out differences its actual curvature and that of the roof.

The exposed end of the leg of the leg spring that interacts with the part which is integral with the roof is suitably bent into a skid, which contributed to an easy and quiet relative movement between this leg and the part which is integral with the roof. For the same reasons, the leg of the leg spring that interacts with the part which is integral with the roof, preferably, carries a friction and/or noise reducing plastic covering.

In another embodiment of the invention, the design is made so that, in the nonoperating position of the wind deflector, the leg spring completely disappears into a downwardly open recess of the air conducting profile member. In this way, the structural height of the wind deflector assembly can be kept especially small.

In another embodiment of the invention, two leg springs are provided that are placed in mirror-image symmetry with respect to a lengthwise axis of symmetry of the cover. These leg springs sit on a bearing bolt running parallel to the cover sliding direction and have a leg which interacts with the integral part of the roof that points, in each case, outwardly in the direction of the adjacent side edge of the roof opening. The part which is integral with the roof and on which the leg springs are braced is, in particular, a drip molding located in the area of the front edge of the roof opening. Such a drip molding slopes toward the side edges of the roof opening. The abovementioned preferred embodiment makes it possible for the legs of the leg springs that interact with the part integral with the roof to follow the slope of the drip molding when the draft deflector is pivoted.

It proved to be especially advantageous if the bearing bolts of the leg springs have a distance from the neighboring outer end of the air conducting profile member that is between 10 and 30%, preferably about 20%, of the total length of the air conducting profile.

In particular, the air conducting profile can be made, optionally, together with the stopping strip and/or the push-out arms, as a hollow, molded plastic part or as a plastic molded part produced by the internal gas pressure (reactive foam) process.

Another simplification of the overall design is achieved if the pivot bearings of the actuating arms have a snap bearing that can be elastically deformed for assembly and in which a bearing bolt is clipped that can be molded on the push-out arms.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 is a top view of a wind deflector according to the invention,

FIG. 2 is a partially exploded view of the wind deflector and schematic depictions of portions of the stationary roof surface and drip molding bottom, in a pushed-out position of the wind deflector, FIG. 3 is a lengthwise section through a motor vehicle roof equipped with the wind deflector according to FIGS. 1 and 2 with a partially opened cover, FIG. 4 is a section according to FIG. 3 with a closed cover, FIG. 5 is, on an enlarged scale, the section through the wind deflector along line V—V of FIG. 1, FIG. 6 is a side view of one of the two leg springs of the wind deflector according to FIGS. 1 to 5 in three different positions, and FIG. 7 is a section corresponding to FIG. 3 for a modified embodiment of the motor vehicle roof.

DETAILED DESCRIPTION OF THE PREFERRED EMBODIMENTS

As shown in FIGS. 3 and 4, a stationary roof surface 10 of a motor vehicle roof is provided with a roof opening 11 which can be selectively closed and at least partially opened by sliding of a rigid cover 12. The roof opening 11 is surrounded in front and on the sides by a roof frame 13 which, in a known way, carries guide rails (not represented) that run in the lengthwise direction of the motor vehicle and on which cover 12 is guided by guide shoes or the like (not shown either). As is known, the roof can be made as a sliding roof or as a lifting-sliding roof. By pushing it back, cover 12 can come to lie under or over the part of stationary roof surface 10 that lies behind the rear edge of roof opening 11.

The motor vehicle roof is made essentially in mirror-image symmetry relative to a central longitudinal axis of the roof. The following explanation of the one side of the roof, including the wind deflector, thus, applies in a like manner to the other side. The terms "front" and "rear" used here refer to the associated ends of a motor vehicle or its forward direction of travel.

On a side part 14 of roof frame 13, there is attached a bearing block 15 that exhibits a partially bearing socket 16 extending over a circular arc of more than 180°. A bearing bolt 17 is clipped into bearing socket 16 during assembly of the roof, by elastically deforming the bearing socket. Bearing bolt 17 is molded on the rear end of an actuating arm 18 and it forms, together with bearing socket 16, a pivot bearing 19 for actuating arm 18. Just like another actuating arm 18 on the opposite side of roof opening 11, actuating arm 18 is integrally connected to an air conducting profile 19 of a wind deflector designated overall by 20.

The air conducting profile 19 runs crosswise along the front edge 21 of roof opening 11 which, in the embodiment shown in FIGS. 3 and 4, is bounded by a seal 22 which is connected to the stationary roof surface 10. Air conducting profile member 19 carries two leg springs 23 that are placed in mirror symmetry with respect to a longitudinal axis of symmetry of cover 12 and of wind deflector 20. Each of leg springs 23 sits on a bearing bolt or pin 24 that runs parallel to the cover sliding direction at locations that are near the lower edge of the air conducting profile member 19 but at a distance from its closest outer end 25 by about 10-30%, preferably 20%, of the total length of the air conducting profile member.

A leg 26 of each leg spring 23 (FIG. 6) lies against an upper wall 27 (FIG. 5) of a downwardly open recess 28 of the air conducting profile 19 and in area of which bearing bolt 24 extends through the air conducting profile member 19. The other leg 29 of each leg spring 23 is braced on bottom 30 of a drip molding 31 of roof frame 13 that runs underneath the front edge 21 of roof opening 11.

An exposed end of leg 29 of leg spring 23 is bent into a skid 32 (FIG. 6) and leg 29 carries, in the area of skid 32, a plastic covering 33 (in phantom outline) that reduces the friction of leg spring 23 relative to bottom 30 of drip molding 31 and, further, acts to reduce noise. As can be seen, especially from FIG. 2, the legs 29 of both leg springs 23, which interact with drip molding 31, are directed laterally outwardly toward the closer side edge of roof opening 11.

In the released state of leg springs 23, leg 29 has the relative position with respect to leg 26 represented in FIG. 6 at I. In the assembled state, leg springs 23 exert a spring force on wind deflector 20 such that, with cover 12 at least partially pushed back, actuating arms 18 are pivoted clockwise around pivot bearings 9 as in FIG. 3. In doing so, legs 29 of leg springs 23 expand in drip molding 31 until a stopping strip 34 strikes a stop formed by seal 22. The stopping strip 34 projects forward from the lower front edge of air conducting profile member 19, and is integrally molded on it so as to extend almost over the entire width of the air conducting profile member, as can be seen especially from FIG. 1. When wind draft deflector 20 is pivoted by leg springs 23 into the operating position determined by the interaction of the stop (seal 22) and stopping strip 34, legs 29 have the relative position with respect to legs 26 indicated in FIG. 6 at II.

In the FIG. 3 condition, the spring force exerted by leg springs 23 is matched to the bending strength of the assembly consisting of the air conducting profile member 19 and the stopping strip 34, so that this assembly, by pressing stopping strip 34 on the stop formed, in this embodiment, by seal 22, is automatically forced into a curvature in its lengthwise direction that at least approximately corresponds to the roof curvature. Optionally, the seal 22 can also be deformed to a certain limited extent. Overall, an automatic matching of the curvature of the assembly 19, 34 having a relatively low bending strength to the respective roof curvature is taken care of. Independently of manufacturing and assembly tolerances of the roof and of the wind deflector, and without requiring a height adjustment of the wind deflector, a perfect alignment of air conducting profile 19 with respect to stationary roof surface 10 is always guaranteed. Thus, optimal air conducting characteristics are assured, and disturbing wind noises are minimized. As can be seen from FIG. 3, air conducting profile member 19, in its operating position, needs to project only relatively slightly above stationary roof surface 10.

If cover 12 is pushed forward into its closed position (FIG. 4), a cam 36, which is located near front edge 35 of cover 12 on its underside, strikes each of the two actuating arms 18. As a result, the actuating arms 18 are pivoted counterclockwise against the force of leg springs 23 from the position of FIG. 3 to that of FIG. 4. In this way, the air conducting profile member 19 is lowered. As profile member 19 is lowered, the skids 32 on the exposed end of legs 29 move outward along the bottom 30 of drip molding 31 until the legs 29, finally, assume the relative position opposite legs 26 represented in FIG. 6 at III. In doing so, each leg spring 23 completely disappears into the respective associated recess 28 of the air conducting profile member 19.

It is to be understood that the stop that interacts with stopping strip 34 of wind deflector 20 need not be a seal integral with the roof corresponding to seal 22. For example, FIG. 7 shows a modified embodiment in which cover 12 is equipped with an encircling seal 37 and stopping strip 34 is pressed, in the operating position of wind deflector 20, against a stop that is formed by a downturned edge 38 of the stationary roof.

Air conducting profile member 19 can, preferably, be made as a downwardly open hollow molded part. But the air conducting profile can also comprise a hollow body that is open downward only in the area of recesses 28, the hollow body being produced by the Controlled Internal Pressure Process (CINPRES).

While we have shown and described various embodiments in accordance with the present invention, it is understood that the same is not limited thereto, but is susceptible of numerous changes and modifications as known to those skilled in the art, and we, therefore, do not wish to be limited to the details shown and described herein, but intend to cover all such changes and modifications as are encompassed by the scope of the appended claims.

We claim:

1. Wind deflector for motor vehicle roofs of the type having a slidable cover for selectively closing and at least partially opening a roof opening in a stationary roof surface, the wind deflector comprising an elongated air conducting profile member that is disposed at a front edge of the roof opening running across the roof opening, spring means for pushing the air conducting profile member out into an operating position and actuating arms at each end of the profile member, said actuating arms being hinged to a part which is integral with the stationary roof surface, and means for swinging said actuating arms in response to movement of the cover into a closed cover position as a means for lowering the air conducting profile member into a nonoperating position; wherein the air conducting profile member, in an edge area spaced from the actuating arms, carries a stopping strip which extends over more than half of the width of the air conducting profile member and which lies against a stop on the front edge of the roof opening in the operating position of the wind deflector as a means for limiting the outward movement of the wind deflector; and wherein the spring force of said spring means is coordinated to the bending strength of an assembly consisting of the air conducting profile member and stopping strip as a means for automatically forming a lengthwise curvature in the air conducting profile member that at least approximately corresponds to a transverse curvature of the stationary roof surface by pressing the stopping strip on the stop.

2. Wind deflector according to claim 1, wherein the assembly consisting of the air conducting profile member and the stopping strip has a design curvature in a released state that matches a design value of the transverse curvature of the stationary roof surface for minimizing the extent to which the assembly must be deformed to compensate for manufacturing and assembly tolerances.

3. Wind deflector according to claim 1, wherein the air conducting profile member and the stopping strip are formed as one piece with one another.

4. Wind deflector according to claim 3, wherein the air conducting profile member and actuating arms are formed as one piece with one another.

5. Wind deflector according to claim 1, wherein said spring means comprises a leg spring that is connected to the air conducting profile member having a first leg which is braced on the air conducting profile member and a second leg for engaging on an integral part of the stationary roof surface located under the air conducting profile member.

6. Wind deflector according to claim 5, wherein a free end of the second leg of the leg spring is bent into a skid.

7. Wind deflector according to claim 6, wherein the second leg of the leg spring carries a plastic covering.

8. Wind deflector according to claim 5, wherein, in the nonoperating position of wind deflector, the leg spring is completely within a downwardly open recess of the air conducting profile member.

9. Wind deflector according to claim 5, wherein the leg spring sits on a bearing member that runs parallel to a cover sliding direction.

10. Wind deflector according to claim 9, wherein two said leg springs are provided in mirror-image symmetry with respect to a longitudinal axis of symmetry of the cover, the second leg of each of the leg springs pointing outwardly toward a respective closest end of the air conducting profile member.

11. Wind deflector according to claim 10, wherein the bearing member of each leg spring is located at a distance from the respective closest outer end of air conducting profile member that is between 10 and 30% of the total length of the air conducting profile member.

12. Wind deflector according to claim 11, wherein the air conducting profile member is made of a molded plastic part.

13. Wind deflector according to claim 12, wherein each actuating arm has a pivot bearing which engages a a bearing socket that can be elastically deformed for clipping of the pivot bearing into it.

14. Wind deflector according to claim 13, wherein the pivot bearing is molded on each actuating arm.

15. Wind deflector according to claim 1, wherein the air conducting profile member and actuating arms are formed as one piece with one another.

16. Wind deflector according to claim 15, wherein said spring means comprises a leg spring that is connected to the air conducting profile member having a first leg which is braced on the air conducting profile member and a second leg for engaging on an integral part of the stationary roof surface located under the air conducting profile member.

17. Wind deflector according to claim 16, wherein a free end of the second leg of the leg spring is bent into a skid.

18. Wind deflector according to claim 17, wherein the second leg of the leg spring carries a plastic covering.

19. Wind deflector according to claim 16, wherein, in the nonoperating position of wind deflector, the leg spring is received within a downwardly open recess of the air conducting profile member.

20. Wind deflector according to claim 16, wherein the spring means comprises a pair of said leg springs, each of which sits on a bearing member which is located at a distance from a respective closest outer end of air conducting profile member that is between 10 and 30% of the total length of the air conducting profile member.

* * * * *